(12) United States Patent
Gazewood

(10) Patent No.: US 6,276,690 B1
(45) Date of Patent: Aug. 21, 2001

(54) RIBBED SEALING ELEMENT AND METHOD OF USE

(76) Inventor: Michael J. Gazewood, 402 Machine Loop, Scott, LA (US) 70583

( * ) Notice: Subject to any disclaimer, the term of this patent is extended or adjusted under 35 U.S.C. 154(b) by 0 days.

(21) Appl. No.: 09/303,201

(22) Filed: Apr. 30, 1999

(51) Int. Cl.$^7$ .................................................. E21B 33/10
(52) U.S. Cl. ........................... 277/336; 277/339; 166/123
(58) Field of Search ................................. 277/322, 336, 277/337, 338, 339, 340, 341, 342; 166/207, 217, 179, 118, 123

(56) References Cited

U.S. PATENT DOCUMENTS

| | | | |
|---|---|---|---|
| 1,804,619 | * 5/1931 | Humason | 277/339 X |
| 1,919,853 | * 7/1933 | Mack | 277/339 X |
| 2,345,873 | * 4/1944 | Hart | 277/339 X |
| 2,464,713 | * 3/1949 | Penick | 277/339 X |
| 3,948,321 | 4/1976 | Owen . | |
| 4,628,997 | * 12/1986 | Schraub | 277/339 |
| 4,753,444 | * 6/1988 | Jackson et al. | 277/338 X |

OTHER PUBLICATIONS

Excerpts from Owen Oil Tools, Inc. catalog, pp. 2–17 (1997 Issue).

* cited by examiner

Primary Examiner—Michael F. Trettel
Assistant Examiner—James M Hewitt
(74) Attorney, Agent, or Firm—Domingue & Waddell, PLC

(57) ABSTRACT

A device for sealing and anchoring within a tubular member. The device includes a top swage member disposed within the tubular member, with the top swage member having a longitudinal center of axis. Also included is a first sealing member disposed about the top swage member, with the first sealing member containing a first plurality of circumferential ribs disposed about the first sealing member. The device may also include a second sealing member that is attached to the first sealing member, with the second sealing member containing a second plurality of circumferential ribs disposed about the second sealing member. A bottom swage member is disposed within the second sealing member, with the bottom swage member having a longitudinal center of axis. The device further includes a setting apparatus for driving the top swage longitudinally downward relative to the top swage's longitudinal center axis and for driving the bottom swage longitudinally upward relative to the bottom swage's center axis. In the preferred embodiment, the top swage member has a first cylindrical surface that extends to a second conical surface, and wherein the first cylindrical surface is disposed within the first sealing member. Additionally, the bottom swage member will have a first cylindrical surface that extends to a second conical surface, with the first cylindrical surface being disposed within the second sealing member. A method of anchoring and sealing a device within a tubular member is also included.

12 Claims, 15 Drawing Sheets

DETAIL A

RIBBED SEALING ELEMENT AND METHOD OF USE

BACKGROUND OF THE INVENTION

This invention relates to a ribbed sealing element for use in a well bore. More particularly, but not by way of limitation, this invention relates to a ribbed sealing element and method for using the ribbed sealing element in a well bore.

In the oil and gas industry, a well is drilled to a subterranean hydrocarbon reservoir. A casing string is then run into the well and the casing string is cemented into place. The casing string can then be perforated and the well completed to the reservoir. A production string may be concentrically placed within the casing string and production of the hydrocarbons may begin, as is well understood by those of ordinary skill in the art.

During the drilling, completion, and production phase, operators find it necessary to perform various remedial work, repair and maintenance to the well, casing string, and production string. For instance, holes may be created in the tubular member accidentally or intentionally. Alternatively, operators may find it beneficial to isolate certain zones. Regardless of the specific application, it is necessary to place certain down hole assemblies such as a liner patch within the tubular member, and in turn, anchor and seal the down hole assemblies within the tubular member.

Numerous devices have been attempted to create a seal and anchor for these down hole assemblies. For instance, in U.S. Pat. No. 3,948,321 entitled "LINER AND REINFORCING SWAGE FOR CONDUIT IN A WELLBORE AND METHOD AND APPARATUS FOR SETTING SAME" to Owen et al, a method and apparatus for emplacing a liner in a conduit with the use of swage means and a setting tool is disclosed. The Owen et al invention anchors and seals the liner within the wellbore.

Despite these advances, the prior art suffers from the ability to properly anchor the down hole assembly into the tubular member. Also, the prior art devices do not properly seal within the tubular members. Therefore, there is a need for a device that will properly set, anchor and seal within a tubular member.

SUMMARY OF THE INVENTION

A device for sealing and anchoring within a tubular member is disclosed. The device comprises a top swage member disposed within the tubular member, with the top swage member having a longitudinal center of axis. Also included is a first sealing member disposed about the top swage member, with the first sealing member containing a first plurality of circumferential ribs disposed about the first sealing member. The device also includes a second sealing member that is attached to the first sealing member, with the second sealing member containing a second plurality of circumferential ribs disposed about the second sealing member.

A bottom swage member is disposed within the second sealing member, with the bottom swage member having a longitudinal center of axis. The device further comprises a setting means for driving the top swage longitudinally downward relative to the top swage's longitudinal center axis and for driving the bottom swage longitudinally upward relative to the bottom swage's center axis.

The device may further comprise an extension member disposed between the first sealing member and the second sealing member. The extension member will have a first end connected to the first sealing member and a second end connected to the second sealing member. In the preferred embodiment, the top swage member has a first cylindrical surface that extends to a second conical surface, and wherein the first cylindrical surface is disposed within the first sealing member. Additionally, the bottom swage member will have a first cylindrical surface that extends to a second conical surface, with the first cylindrical surface being disposed within the second sealing member.

In one of the embodiments, the ribs of the first and second sealing member is a series of grooves, with the grooves having a radius of curvature of between 0.030 inches to 0.060 inches, and wherein the outer diameter of the series of grooves is essentially equal to the outer diameter of the first sealing member. Additionally, the first and second sealing member may have disposed thereon an elastomeric seal such as an O-ring.

In the preferred embodiment, the first and second sealing member is comprised of a metal having a hardness that is equal to or less than 105 on the Rockwell B scale, and wherein the metal is medium to high ductility and medium to low hardness; moreover, the preferred micro structure of the metal is to be spheroidized but some pearlitic micro structures are acceptable. Further, the top swage member and the bottom swage member, in the preferred embodiment, is comprised of a high tensile steel, that has a hardness generally higher than 108 on the Rockwell B scale.

A method of sealing and anchoring a device within a tubular member is also disclosed. The method includes positioning the device in an internal diameter wall of the tubular member and driving the top swage longitudinally downward relative to the top swage's longitudinal center of axis with a setting tool member. The setting tool member is selectively attached to the device. The method further includes expanding the first sealing member radially outward and embedding at least one of the first plurality of circumferential ribs into the inner diameter wall which in turn seals and anchors the device within the internal diameter wall. The embedding of the ribs produces a slight circumferential indentation profile in the internal diameter wall.

The method further comprises driving the bottom swage longitudinally upward relative to the bottom swage's longitudinal center of axis and expanding the second sealing member radially outward. This expansion will embed at least one of the second plurality of circumferential ribs into the inner diameter wall which in turn seals and anchors the device within the internal diameter wall. The embedding of the ribs produces a slight circumferential indentation profile in the internal diameter wall.

In one of the embodiments, the first sealing member further comprises a first elastomeric member circumferentially disposed thereon and wherein the step of expanding the first sealing member radially outward includes forcing the first elastomeric member against the internal diameter wall so that a secondary seal is provided for the device within the internal diameter wall. Additionally, the second sealing member may further comprise a second elastomeric member circumferentially disposed thereon and wherein the step of expanding the second sealing member radially outward includes forcing the elastomeric member against the internal diameter wall so that a tertiary seal is provided for the device within the internal diameter wall.

In one of the embodiments, the step of driving the top and bottom swage upward and downward includes pumping a fluid down the inner bore and forcing a power piston in the tool in an upward direction so that the lower swage is moved upward thereby forcing an outer sleeve in the tool in a downward direction so that the upper swage is moved downward. The continued pumping will result in the shearing of a shear ring selectively attaching the device to the setting tool means. Next, the setting tool means may be retrieved from the tubular member.

An advantage of the present invention includes having a seal element creating a metal-to-metal seal within the tubular member. Another advantage is that a series of ribbed seal elements are created. Each of the individual circumferential ribs may create a seal so that multiple seals may be created with the ribbed elements. Yet another advantage is that the ribbed seal elements are harder to damage than elastomeric types currently used.

Still yet another advantage is that since the individual rows of sealing elements are actually embedded, the device functions as an anchor to the device that is set in a tubular member. The embedded annular rings affix the device within the tubular string so that the device remains stationary during subsequent operations.

Still yet another advantage is that a polymeric seal may also be included with the novel sealing element. Another advantage is that the inner diameter wall of the tubular member that the device is set within does not require the degree of cleanliness as is the case with polymeric seals. Yet another advantage is that the novel seal element may be employed with tubing patches, casing patches, gravel pack assemblies, and other down hole assemblies that are required to be hung-off within the tubular string.

A feature of the present invention includes the ribbed sealing elements having a radius of curvature which form individual rings. The individual rings are not spirally interconnected such as thread means. Another feature is that the sealing mechanism may have a series of ribbed sealing elements followed by a polymeric seal followed by another series of ribbed sealing elements. Yet another feature is that the design can be used in highly deviated and horizontal tubular members, as well as in subterranean well bores and surface pipe lines that may destroy an elastomeric seal during conveyance into the desired position in the well bore.

Prior art slips set into a tubular member tend to cause a stress concentration at the point of engagement with the tubular member. This point of stress concentration can cause problems including causing a weak point in the tubular member. Accordingly, another feature of the present invention is that the individual rows of sealing elements that are embedded into the tubular member produce a slight circumferential indentation profile in the production tubing wall that creates a substantially lower stress concentration in the production tubing as opposed to the sharp indentations of a prior art slip for anchoring strength. These and many other uses of the present novel invention will be apparent from a reading of the detailed description of the preferred embodiments.

DETAILED DESCRIPTION OF THE PREFERRED EMBODIMENTS

Figure 1:
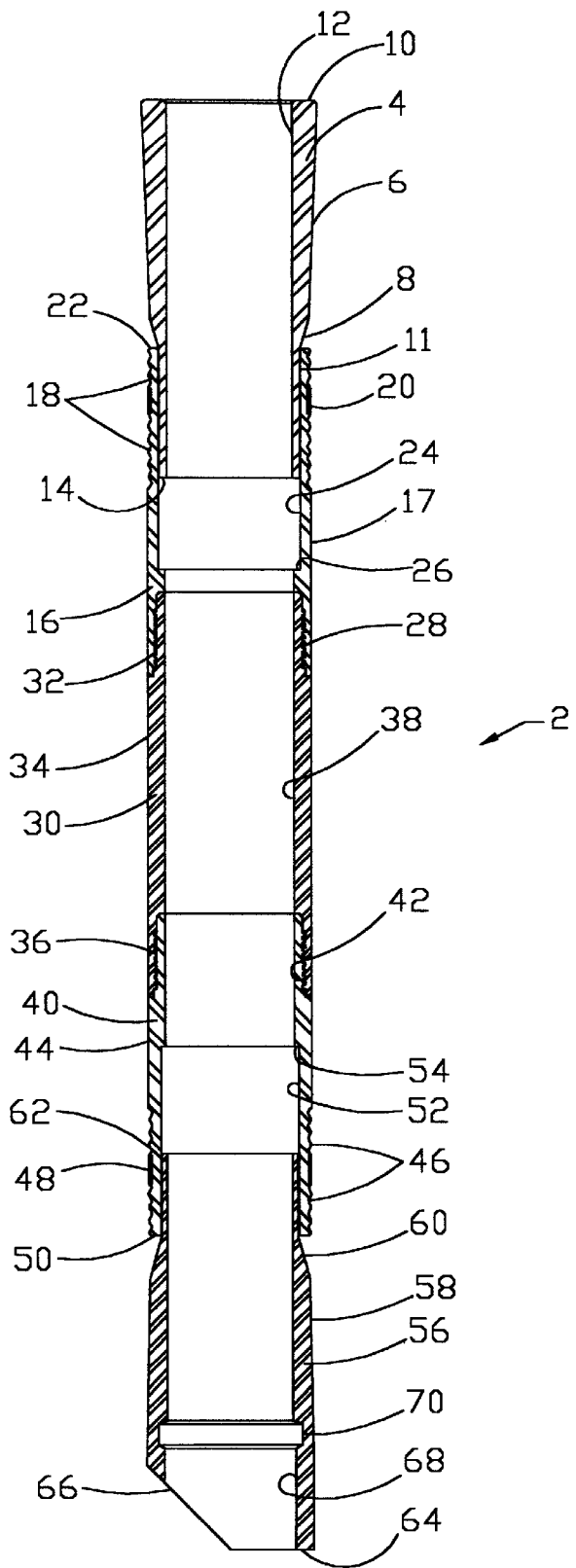
FIG. 1 is a cross-sectional view of the novel device before the engagement of the sealing mechanisms.

Referring now to FIG. 1, a cross-sectional view of the novel device 2 before engagement of the sealing mechanisms will now be described. The device 2 generally contains a top swage 4. The top swage 4 contains a first tapered outer cylindrical surface 6 that extends to a conically tapered surface 8 which in turn extends to the second outer cylindrical surface 10. The top swage 4 has a top end 10 that extends radially inward to the inner bore surface 12 that terminates at the end 14. In the preferred embodiment, the top swage 4 is made of high tensile steel, having a 108 or higher on the Rockwell B scale.

The top sealing member 16 consist of an outer cylindrical surface 17 having a series of ribbed sealing elements denoted by the numeral 18. The ribbed sealing elements 18 comprises an annular groove formed in the outer cylindrical surface 17, with the groove having (in one of the embodiments) a radius of curvature that will be described in greater detail later in the application. In the preferred embodiment, the circumferential ribbed sealing elements 18 will generally have an outer diameter that is equal to the outer diameter of the outer cylindrical surface 17.

The outer cylindrical surface also has contained thereon an elastomeric seal 20, also referred to as an O-ring or polymeric seal, that is also utilized in providing a seal with an inner wall of a concentric tubular member, as will be described later in the application. The sealing member 16 has a first end 22 that extends radially inward to an inner bore 24, shoulder 26, and internal thread means 28. The sealing member 16 is a metal material having a hardness of 105 or less on the Rockwell B scale, in the preferred embodiment.

The sealing member 16 is threadedly attached to the extension member 30. The extension member 30 has external thread means 32 that advances to the outer cylindrical surface 34. Extending radially inward is the internal thread means 32 that in turn extends to the inner bore 38.

The internal thread means 36 is threadedly mated to the lower sealing member 40 via the external thread means 42. The lower sealing member 40 contains the outer cylindrical surface 44 that has a series of ribbed sealing elements denoted by the numeral 46. The ribbed sealing elements 46 comprises an annular groove formed in the outer cylindrical surface 44. In the preferred embodiment, the circumferential ribbed sealing elements 46 will generally have an outer diameter that is equal to the outer diameter of the outer cylindrical surface 44.

The outer cylindrical surface also has contained thereon an elastomeric seal 48 also referred to as an O-ring, that is also utilized in providing a seal with an inner wall of a concentric tubular member, as will be described later in the application. The sealing member 40 has a first end 50 that extends radially inward to an inner bore 52, and shoulder 54. In the preferred embodiment, the sealing member 40 is also a metal member, with the metal having a hardness of 105 or lower on the Rockwell B scale. The device 2 will also contain a bottom swage 56. The bottom swage 56 contains a first tapered outer cylindrical surface 48 that extends to a conically tapered surface 60 which in turn extends to the second outer cylindrical surface 62. The bottom swage 56 has a bottom end 64 that contains a chamfered surface 66 which in turn extends radially inward to the inner bore surface 68 that contains the annular groove 70. The bottom swage 56 is also made of metal and in the preferred embodiment is a high tensile steel that has a hardness of 108 or higher on the Rockwell B scale.

Figure 2A:
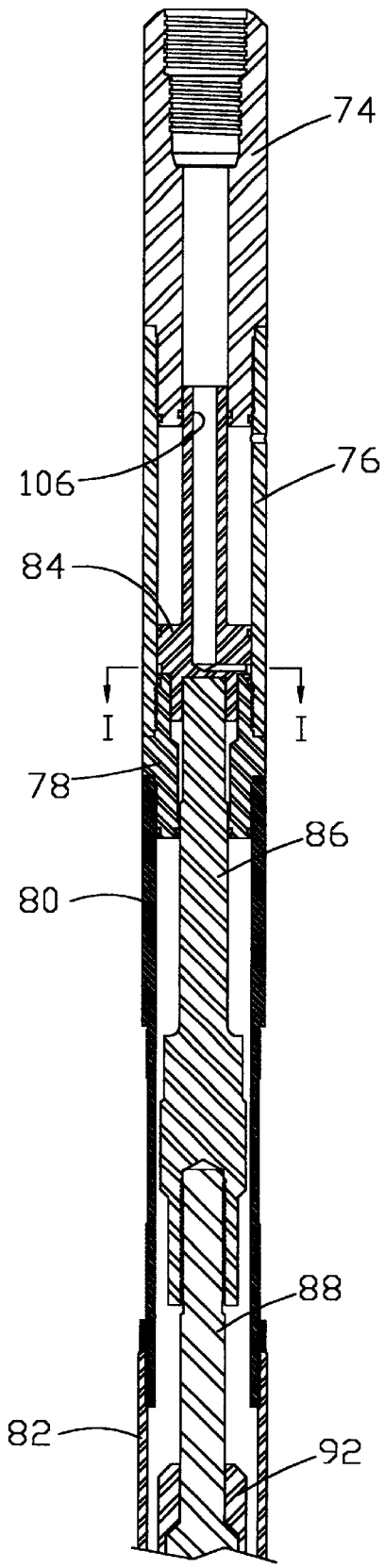
FIGS. 2A–2B are a cross-sectional view of the device of FIG. 1 along with the setting tool means for setting the device within a tubular member.
Figure 2B:
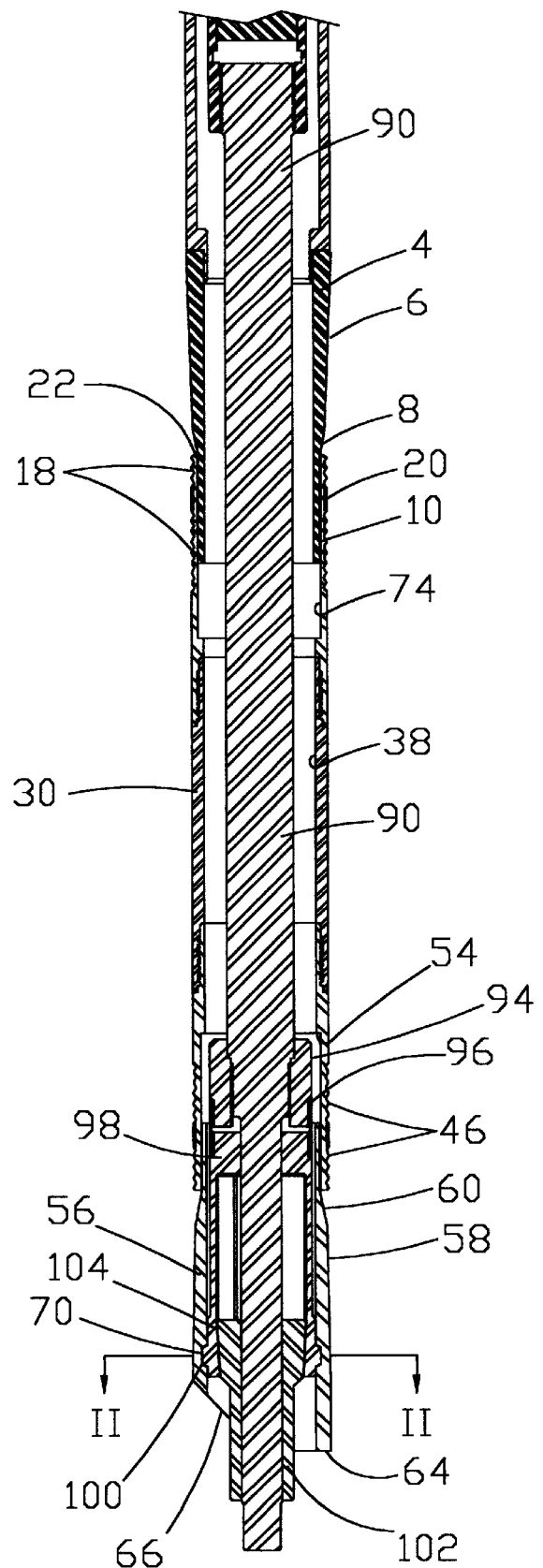

Referring now to FIGS. 2A–2B, a cross-sectional view of the device 2 of FIG. 1 along with the setting tool means for setting the device within a tubular member will now be described. It should be noted that like numbers appearing in the various figures refer to like components. The setting tool means consist of a first sub 74 that is attached to a second cylindrical member 76 that is in turn connected to the bushing 78. The bushing 78 extends to the third cylindrical member 80 that is threadedly attached to the fourth cylindrical member 82. The member 82 abuts the device 2 at the end 10.

The setting tool means also includes the power piston 84 that is threadedly attached to the adapter rod 86 which in turn extends to the first adapter rod extension 88, with first extension being connected to the second adapter rod extension 90 via the connector sub 92. The second rod extension 90 is made up to the shear ring bushing 94, with the bushing 94 having a shear ring 96. The shear ring 96 is selected for separation at a preselected tensile pull force, as is recognized by those of ordinary skill in the art. The shear ring 96 is in turn made up to the collet 98, with the collet 98 extending to the latch member 100.

The latch member 100 engages the annular groove 70. Threadedly attached to the bottom end of the rod is the collet support nut 102, with the support nut containing the angled shoulder 104 that engages the collet 98 to seat the latch member 100 into the annular groove 70. Other types of setting tool means are commercially available. For instance, one type is available from Owen Oil Tools, Inc. of Fort Worth, Tex. under the names Casing Patch and Tubing Patch. The Catalog Entry for the Casing Patch and Tubing Patch from Owen Oil Tools, Inc. was made a part of the Information Disclosure Statement and is herein incorporated by reference. Further, the U.S. Pat. No. 3,948,321 to Owens et al (referenced earlier) also discloses the setting means and is incorporated herein by reference. It should be noted that other types of setting means are commercially available such as explosively actuated means from Owen Oil Tools, Inc.

Figure 2C:
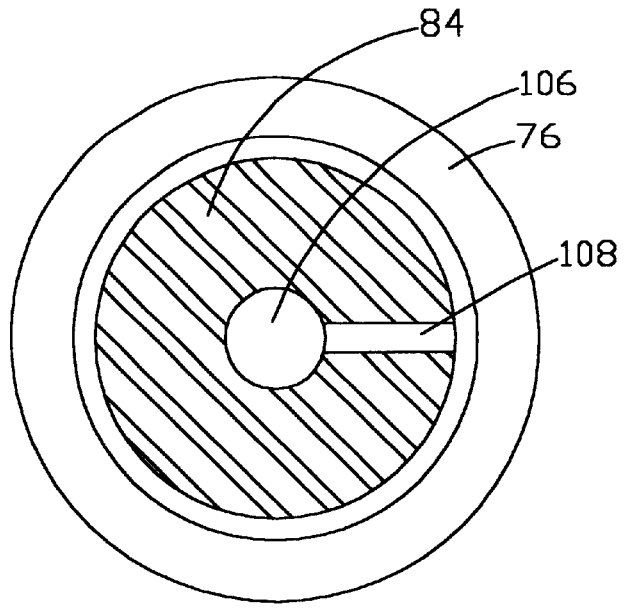
FIG. 2C is a cross-sectional view of the device taken along line I—I of FIG. 2A.
Figure 2D:
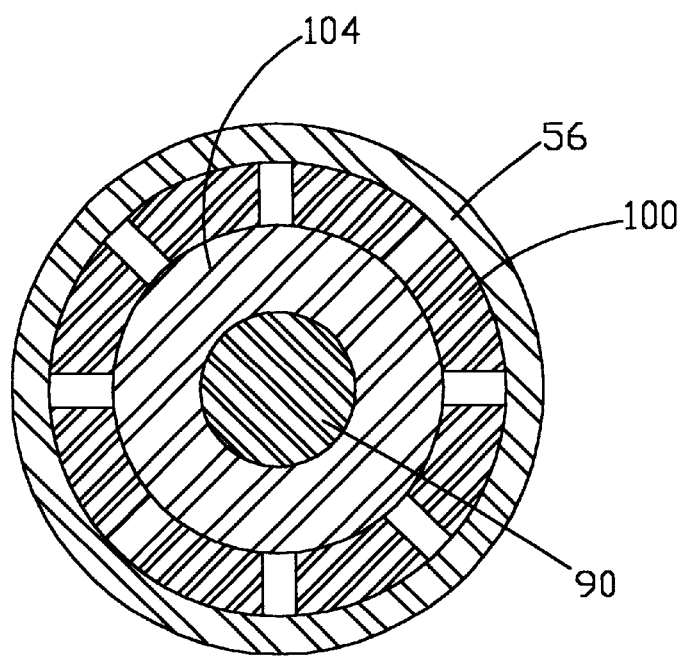
FIG. 2D is a cross-sectional view of the device taken along line II—II of FIG. 2B.

Reference is now made to FIG. 2C which is a cross-sectional view of the device 2 taken along line I—I of FIG. 2A. Thus, the power piston 84 is shown disposed within the second cylindrical member 76. The power piston 84 will have the inner bore 106 that stretches to the lateral passage 108. FIG. 2D depicts a cross-sectional view of the device 2 taken along line II—II of FIG. 2B. This figure illustrates the rod 90 along with the angled shoulder 104 of the collet support nut 102. The collet latch member 100 is also depicted.

Figure 3A:
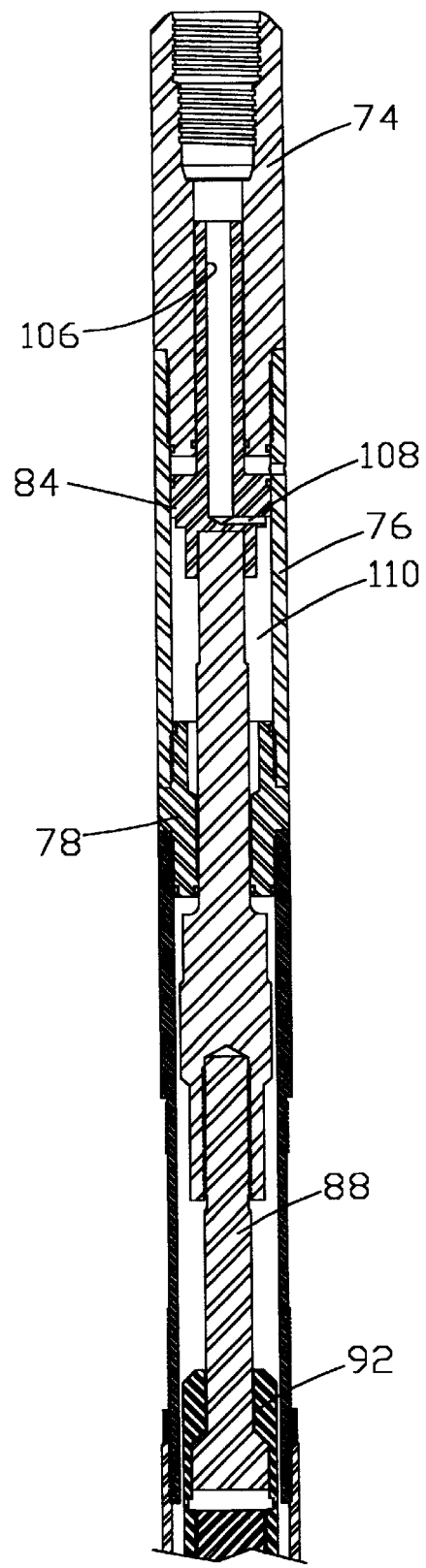
FIGS. 3A–3B are a cross-sectional view of the device of FIGS. 2A–2B illustrating the device in the set position.
Figure 3B:
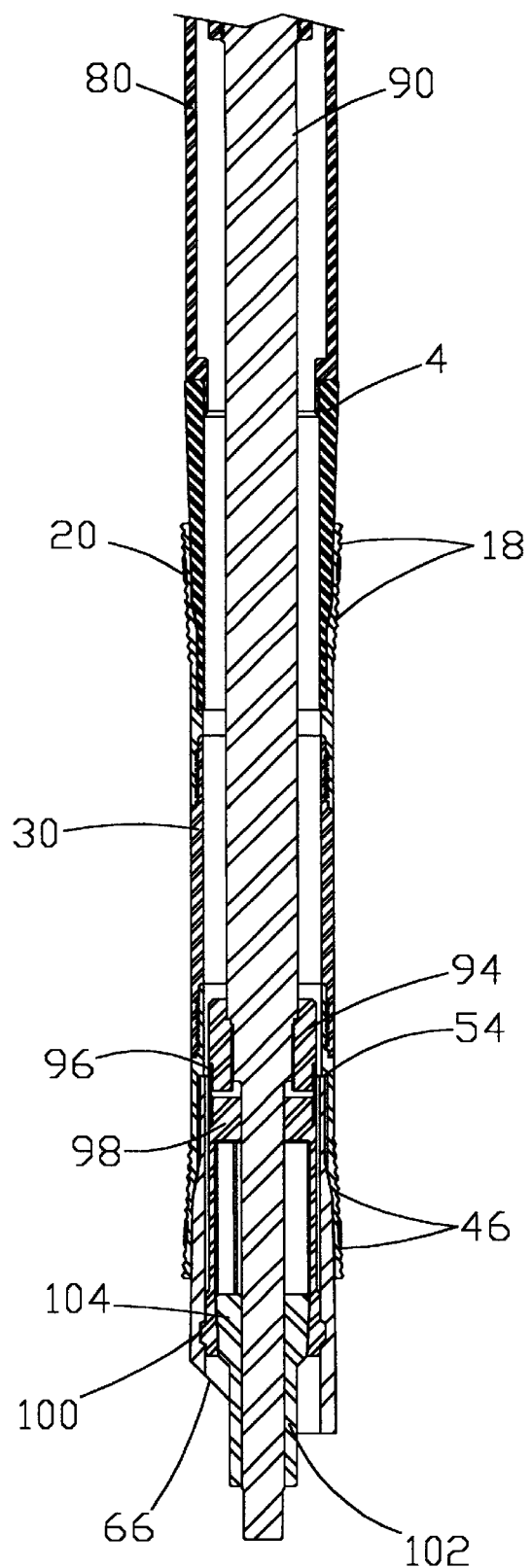

In operation, the setting tool means will work to operatively move the top swage 4 and the bottom swage 56 relative to the top sealing member 16 and the bottom sealing member 56 thereby expanding the top sealing member 16 and bottom sealing member 56 in accordance to the teachings of the present invention. In FIGS. 3A–3B, the cross-sectional view of the device 2 in the set position is illustrated.

Thus, an operator would pump, in the preferred embodiment, a fluid down the inner 106 which is transmitted to the passage 108. The fluid would then enter the chamber 110 causing the power piston 84 to move longitudinally upward relative to the center of the device's 2 axis. During this pumping cycle, and as the power piston 84 is being moved upward, the fluid also acts on the setting tool's cylindrical member 80 which in turn forces the surface 82 against the top swage 6, forcing the top swage 6 into the top sealing member 16.

As the conical surface 8 continues to expand the top swage 6, the ribbed sealing elements 18 will be forced into engagement with the tubular member. At the bottom swage 56, the coluet member 98 is being forced longitudinally upward relative to the center of axis of the device 2, with the latch members 100 engaging the annular groove 70 thereby forcing the bottom swage 56 longitudinally upward into the lower sealing member 40. As the conical surface 60 is forced into the lower sealing member 40, the lower sealing member 40 will expand outward so that the ribbed sealing elements 46 engage the inner walls of the concentric tubular member providing a metal-to-metal seal. As a secondary seal, the elastomeric seals 20 and 48 will also engage the inner walls of the concentric tubular member.

An advantage of the present invention is that while there may be 15 rows of ribbed elements (i.e. 15 rows of ribbed elements comprising the top sealing element 18), not all of the rows need provide a seal with the inner diameter wall. This is also the case with the lower seal elements. Further, the stress concentration of prior art slips can cause damage to the inner tubular walls which can lead to weak points and failure of the tubular which is now obviated by the present invention. In the present invention, the individual rows of sealing elements that are embedded into the tubular member produce a slight circumferential indentation profile in the inner tubular wall that creates a substantially lower stress concentration in the tubular as opposed to the sharp indentations of a prior art slip for anchoring strength.

Figure 4A:
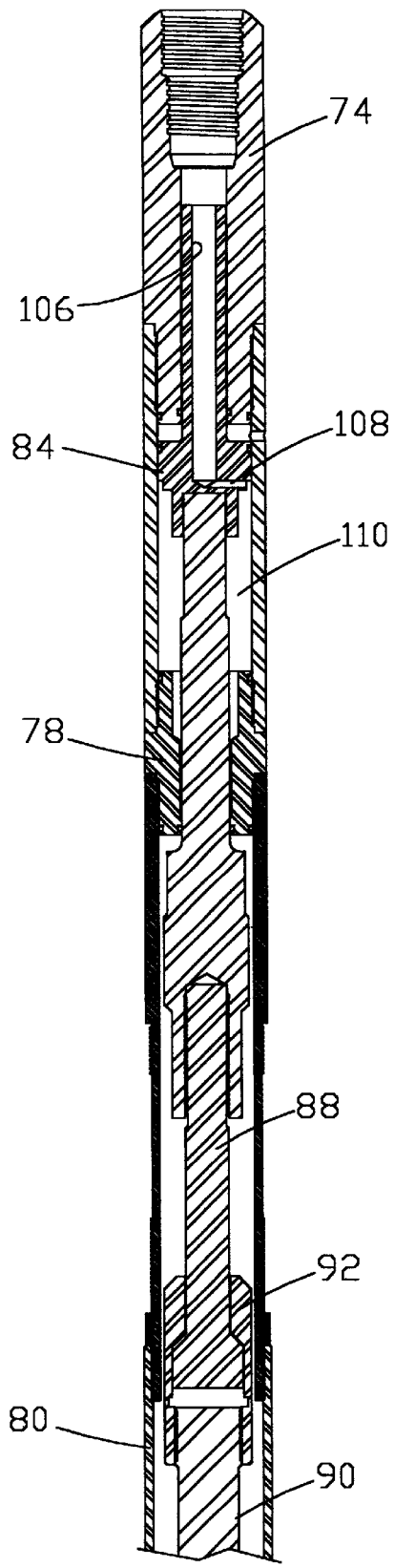
FIGS. 4A–4B are a cross-sectional view of the device of FIGS. 2A–2B illustrating the setting tool being retrieved from the device.
Figure 4B:
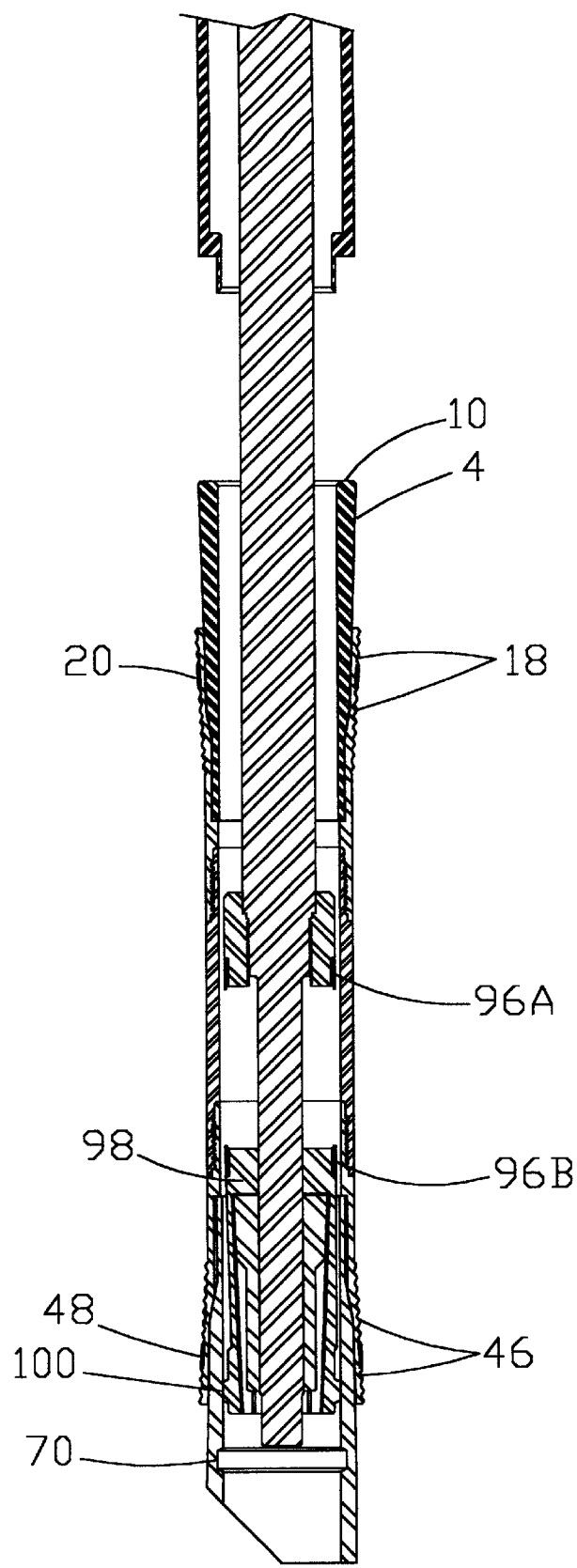

FIGS. 4A–4B are a cross-sectional view of the device of FIGS. 2A–2B illustrating the setting tool being retrieved from the device. Once a predetermined amount of force has been applied via the pumping, the shear ring 96 will shear. This occurs when the upward force of the adapter rod 90 exceeds the shear strength of the shear ring 96. The first sub 74 is operatively connected to an apparatus such a wireline, electric line, work string, coiled tubing string etc. Therefore, the operator may exert an upward pull on the first sub 74 via, for instance, the work string. The power piston 84 along with the entire setting tool means can then be extracted from the device 2. As depicted, the power piston 84, bushing 84, adapter rods 88,90, collet 98 and angled shoulder 104 are attached and will be retrieved. Note that the shear ring 96 has separated into 96a and 96b.

Figure 5:
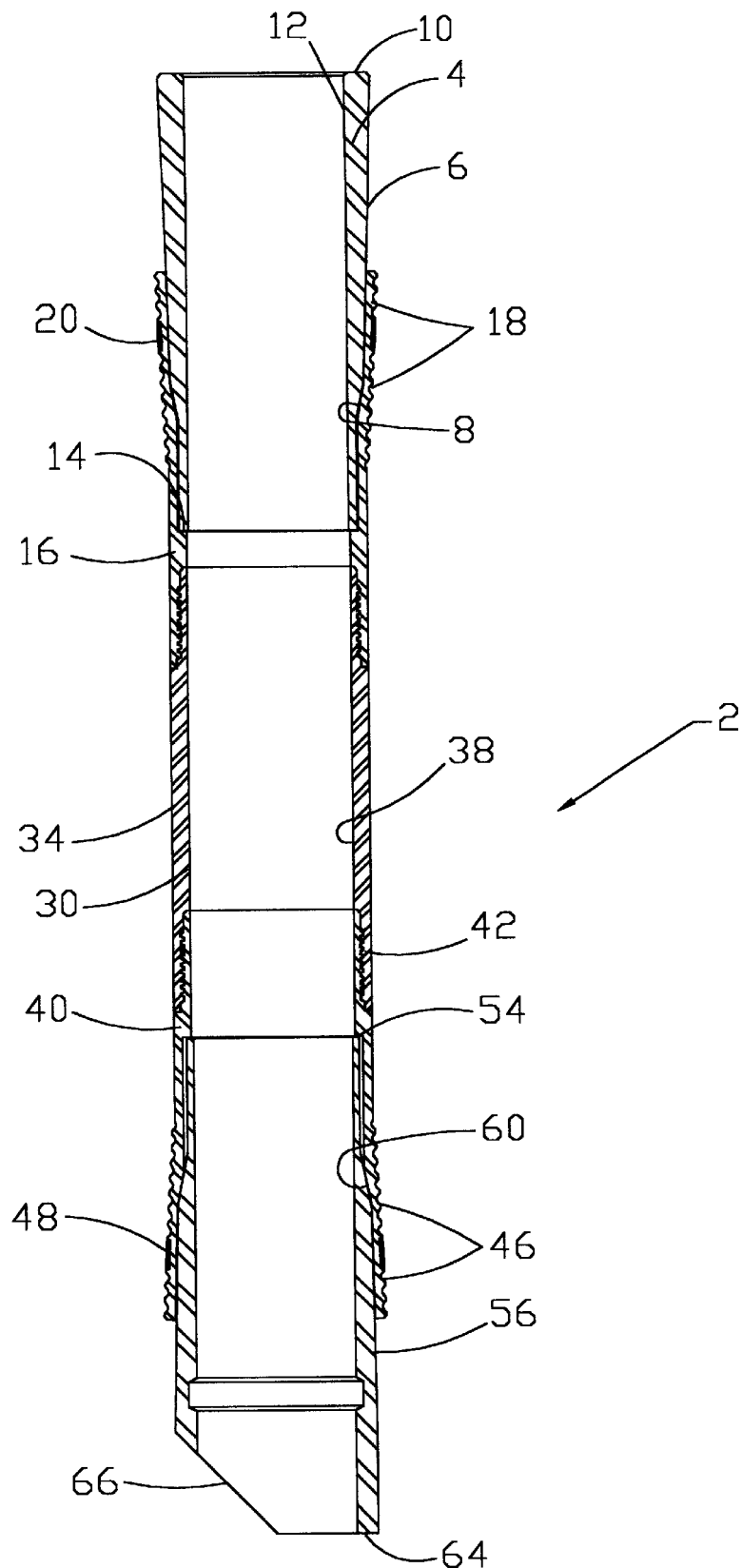
FIG. 5 is a cross-sectional view of the device of FIG. 1 in the set position.

Once the setting tool means has been retrieved, only the device 2 will remain, with the device 2 being in the set position as shown in the cross-section view of FIG. 5. The conically tapered surface 8 of the top swage 4 has caused the top sealing member 16 to expand radially outward which in turn has caused the series of ribbed sealing elements 18 to expand outward into engagement with the inner diameter walls of the tubular member. The elastomeric seal 20 has also been expanded radially outward into engagement with the inner diameter wall. Similarly, the bottom swage 56 has been driven longitudinally upward relative to the device's center of axis so that the conically tapered surface 60 forces the lower sealing member 40, and in particularly, the ribbed sealing elements 46 radially outward into engagement with the inner walls of the tubular member. The elastomeric seal 48 will have also been expanded radially outward into engagement with the inner wall. Thus, the device 2 is set and anchored as shown in FIG. 5.

Figure 6A:
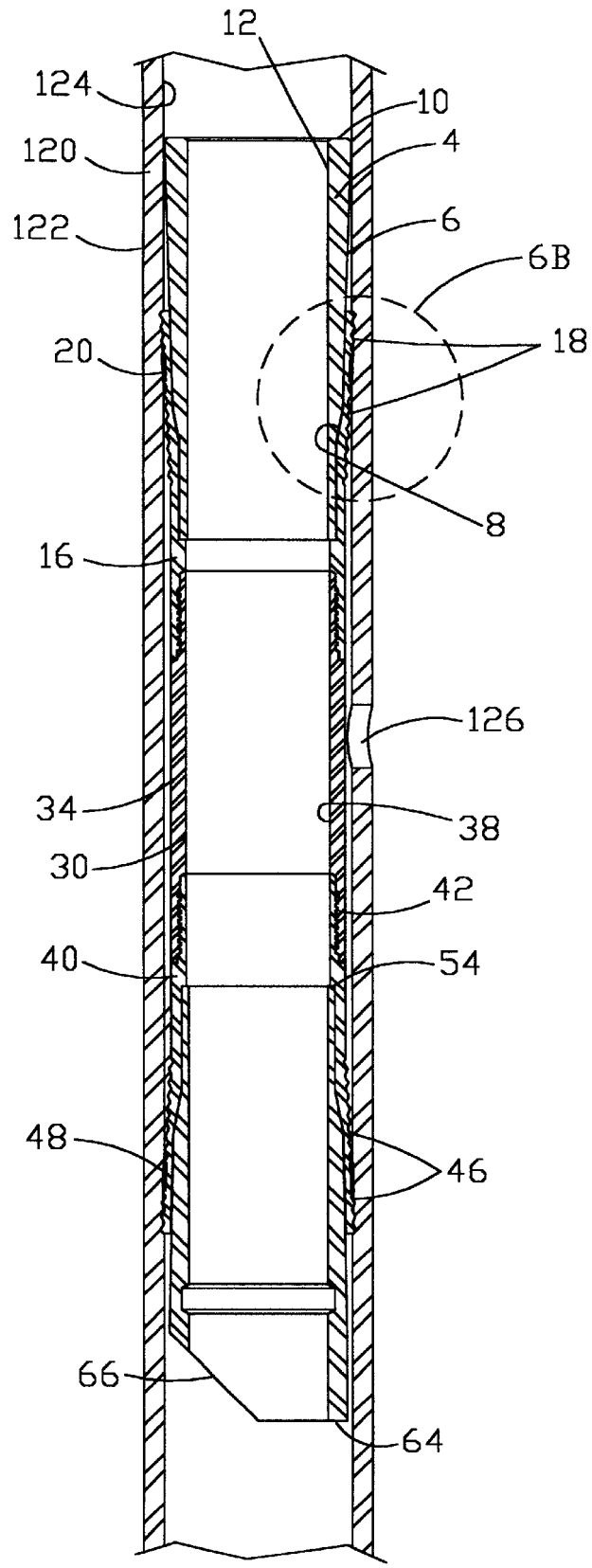
FIG. 6A is a cross-sectional view of the device of FIG. 5 illustrating the device in the set position in a tubular member.

Referring now to FIG. 6A, a cross-sectional view of the set device 2 within a tubular member 120 will now be described. The tubular member 120 will generally be a cylindrical member having an outer diameter surface 122 that extends radially inward to an inner diameter surface 124. In one embodiment, the tubular member 120 may be a highly deviated well (angle of 45 degrees or greater) or horizontal well. The portion of the top sealing member 16 abutting the conical surface 8 has been radially expanded outward causing at least some of the series of ribbed sealing elements 18 as well as the elastomeric element 20 to sealingly engaged inner diameter surface 124. Likewise, that portion of the lower sealing member 40 abutting the conical surface 8 has been radially expanded outward causing at least some of the series of ribbed sealing elements 46 as well as the elastomeric element 48 to sealingly engaged inner diameter surface 124.

FIG. 6A also depicts that the tubular member 120 contains a bole or perforation 126 therethrough. Thus, it can be seen that the novel device herein disclosed will effectively isolate the perforation 126 from the inner portion of the tubular member by providing an upper seal and a lower seal. Notice that the device 2 contains a large inner bore therethrough so that other down hole tools and equipment may be lowered and/or raised therethrough. The embodiment of FIG. 6A depicts the mule shoe configuration 66 that allows for easy entry of, for instance, wireline tools that are required to be conveyed either into the tubular member 120 or out of the tubular member 120 as will be well understood by those of ordinary skill in the art.

Figure 6B:
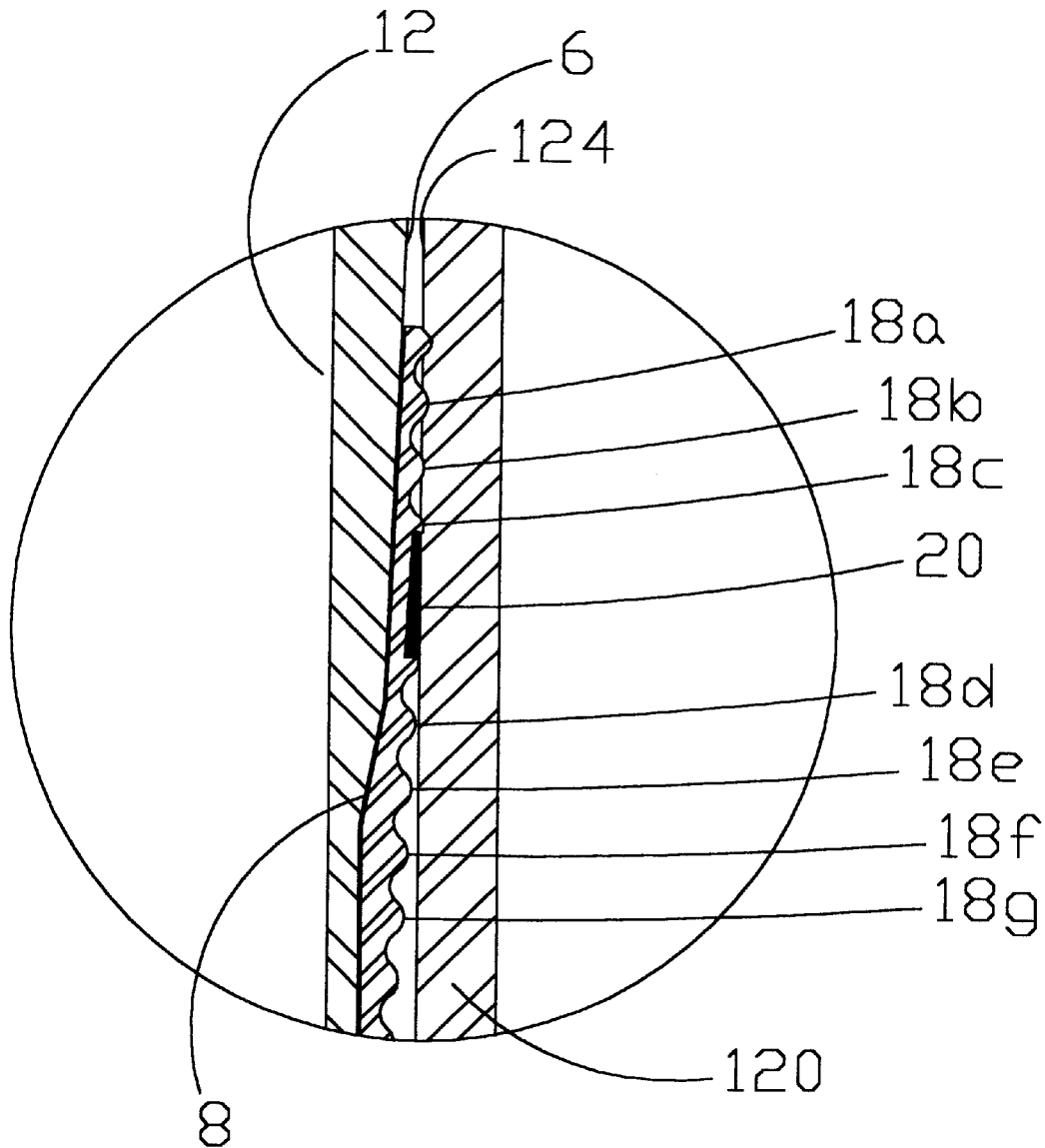
FIG. 6B is a close-up view the ribbed sealing elements taken from FIG. 6A.

An exploded view of the sealing faces of the device 2 is seen in FIG. 6B. Thus, the series of ribbed sealing elements are separated into two groups, 18a,b,c and 18d,e,f,g. As seen, the upper rows 18a, 18b, 18c are embedded into the inner wall surface 124 of the tubular member 120. As will be understood by those of ordinary skill in the art, this is because the cylindrical surface 6 and conical surface 8 has caused the greatest amount of radial expansion. The lower rows 18d, 18e, 18f, 18g do not have as many individual rows actually embedded into the inner wall surface 124 since the cylindrical surface 6 and conical member 8 has not caused as much radial expansion. In other words, individual row 18d may be slightly embedded whereas rows 18e, 18f, 18g have not been radially expanded enough to sealingly engage the inner wall 124.

An advantage of the present invention is that some individual rows (for instance rows 18a,18b,18c, and 18d) may form a metal-to-metal seal while other individual rows (for instance rows 18e,18f,18g) do not form a seal. Thus, there are numerous back-up seals employed with each sealing mechanism. Also, the elastomeric seal means 20 is engaging the inner surface 124 thereby creating yet another tertiary seal. Still yet another advantage is that since the individual rows 18a–18d are actually embedded, the device functions as an anchor to the device that is set in a tubular member 120. The embedded annular rings affix the device within the tubular string. Further, an individual row does not necessarily have to create a seal face with the inner wall in order to aid in the anchoring. Thus, the elements serve a dual purpose so as to seal and anchor the device 2 within the tubular member.

According to the teachings of the present invention, the novel device 2 has many other applications. For instance, the novel device 2 may be used in order to set within a well bore a down hole gravel pack assembly wherein the gravel pack assembly is attached to the bottom of the device 2. The device may also be employed to act as a bridge plug within the well bore. Such an example may be seen in FIG. 7 which is a cross-sectional view of the second embodiment of the present invention. In this case, only the top swage 4 and the top sealing member 16 are employed.

Figure 7A:
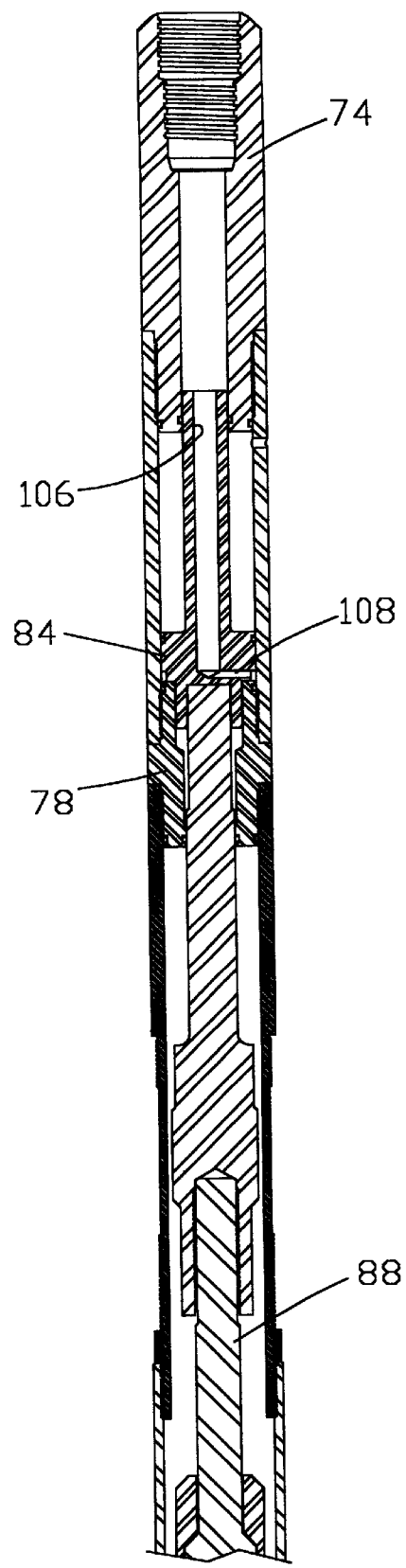
FIGS. 7A and 7B are a cross-sectional view of a second embodiment of the present invention.
Figure 7B:
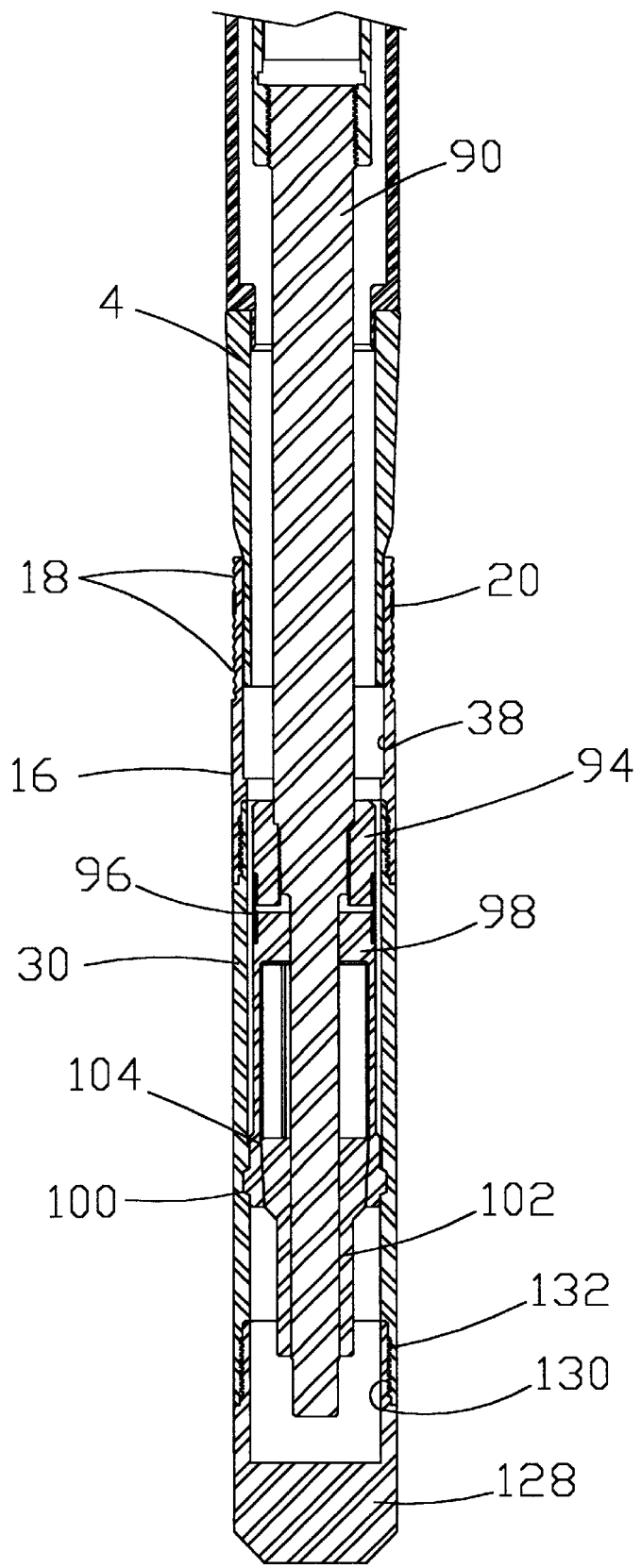

The embodiment of FIG. 7 includes the setting tool means that was previously described, which includes the power piston 84, adapter rods 88,90, bushing 94 and collet 98. The mode of operation remains generally the same in that the hydraulic fluid is pumped down into the inner bore 106 and wherein the hydraulic force will be transferred to the chamber which in turn will force the housing 80 downward and the collet 98 upward, forcing the swage 4 downward in order to radially expand the sealing member 16 as previously described.

This embodiment includes a plank plug 128 that contains the external thread means 130 that will threaddedly attach to the internal thread means 132 of the sleeve extension member 30. The setting tool means will shear at the predetermined force via the shear ring 96, and thereafter, the setting tool means can be pulled from the tubular member as previously described. Once the device 2 is set, the embodiment of FIG. 7 will act as a plug since the sealing elements 18 and the O-ring means 20 will sealingly engage the inner tubular member and the inner bore contains the plank plug 128.

Figure 8A:
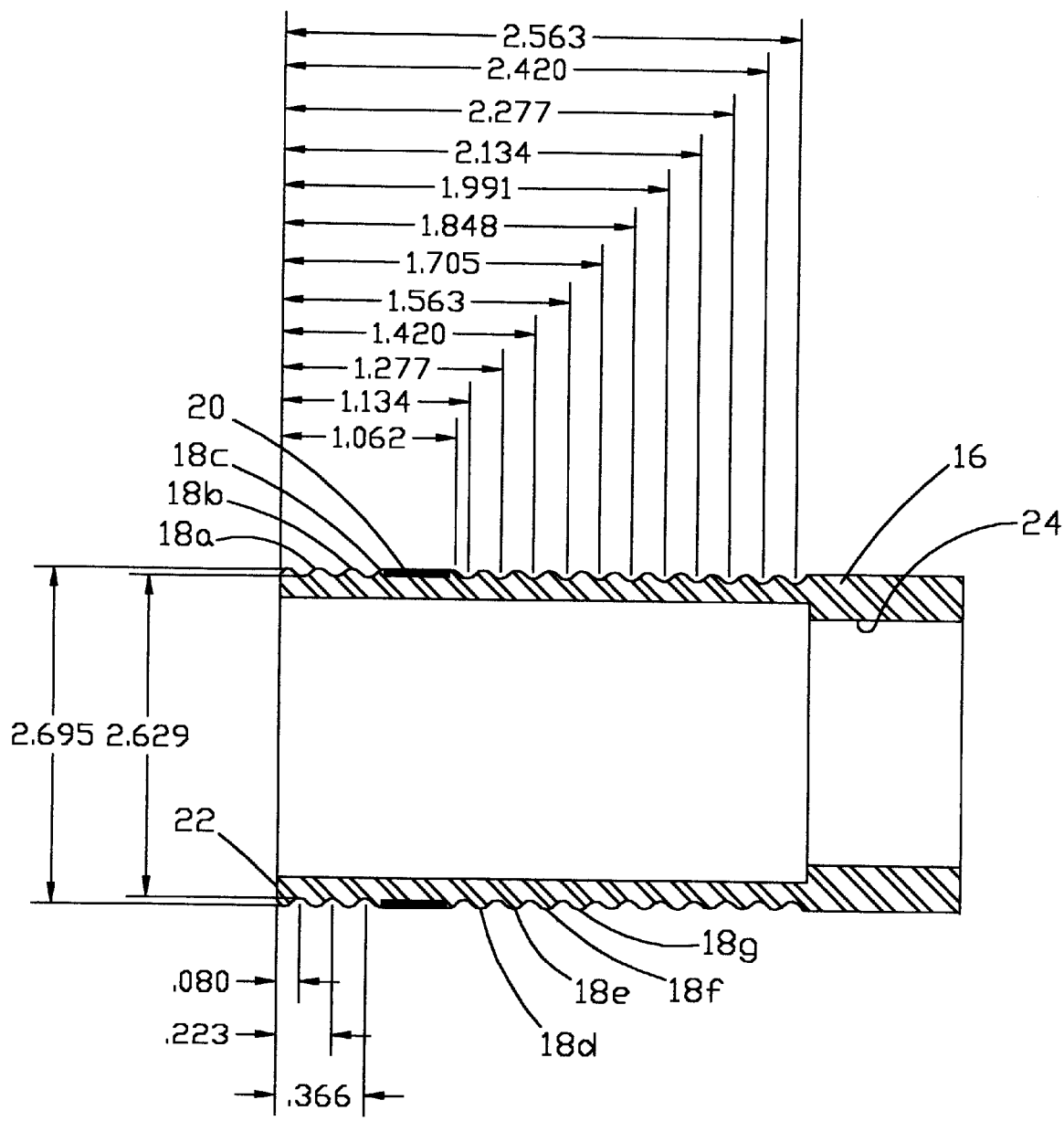
FIG. 8A is a cross-sectional view of the ribbed sealing element of the present invention.

Referring now to FIG. 8A, a cross sectional view of the ribbed sealing elements will now be described. In the embodiment shown in FIG. 8A, the individual rows are approximately 0.143 inches apart. This distance may vary considerably depending on the application. The distance is measured from the peak of one row to the peak of the subsequent row. The number of rows will vary depending on the application, size of the tubular member, depth of the well, anticipated pressures, etc. In the preferred embodiment, at least four rows are included on an individual sealing member. It is possible to use triangularly shaped ribs to form a plurality of circumferential ribs and/or a combination of triangularly shaped ribs with a more rounded shaped rib as seen in FIGS. 1 through 8.

Figure 8B:
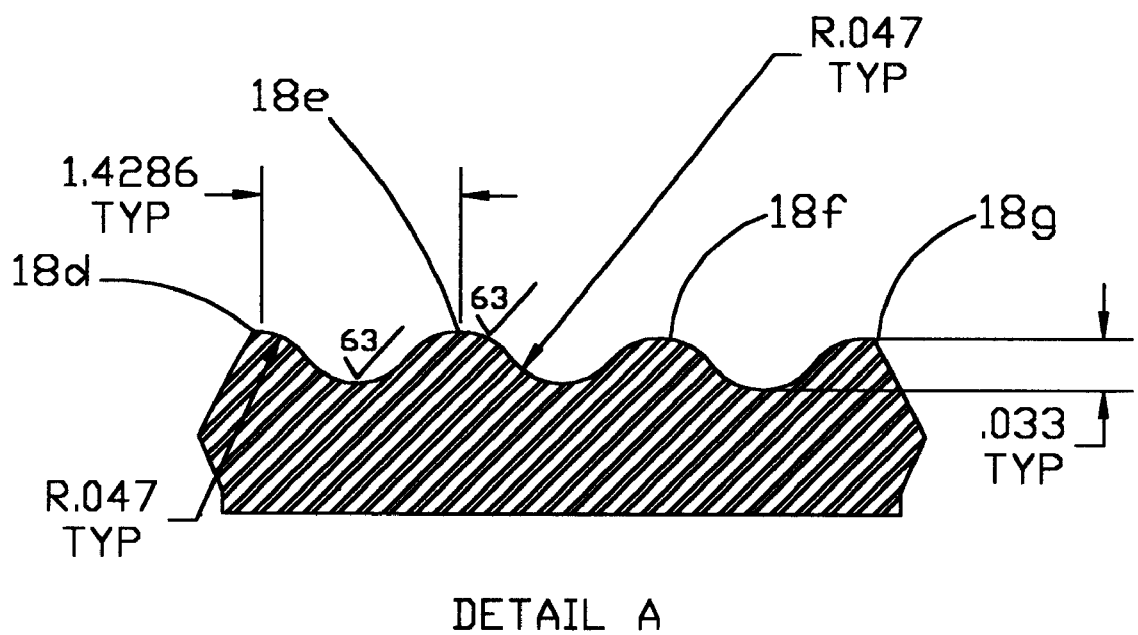
FIG. 8B is a close-up view of the ribs of FIG. 8A.

Two individual rib rows (i.e. 18d & 18e) form a grooved portion. In the preferred embodiment, the radius of curvature of the groove is 0.0470 inches as shown in the exploded view of FIG. 8b. The FIG. 8b depicts the actual distance from the peak of 18d to the peak of 18e as being 0.14286 inches. FIG. 8b also illustrates that in the preferred embodiment, the distance from the peak to the groove bottom is approximately 0.033 inches. The elastomeric seal means 20 is also included. It should be noted that the actual dimensions provided for the distance of one peak to another peak, as well as the radius of curvature, are exemplary. The actual physical dimensions that are employed will vary on the specific application.

The metal that the first and second sealing member is made of can vary. The metal must be malleable so that it can be deformed properly i.e. radially expanded by the swage. On the other hand, the metal must be hard enough to be able to embed within the inner walls of the tubular member in order to form a proper seal and to anchor. The ribbed sealing elements will also be coated with a Teflon type of coating which is commercially available from Great Lakes Chemical Group, Inc. under the registered trademark Everlube. Teflon is a trademark of DuPont Corporation.

Additionally, the swage members will usually have to be a harder metal as compared to the sealing members. A metal, as previously described, is used for the swages. The metal is then coated with a low-temperature, multi-state metal finishing process, based from chrome-plating technology with a process that is commercially available from Armoloy Company under the registered trademark Armoloy.

Changes and modifications in the specifically described embodiments can be carried out without departing from the scope of the invention which is intended to be limited only by the scope of the appended claims.

I claim:

1. A sealing and anchoring apparatus for use in a tubular member, the apparatus comprising:
   a top swage member, said top swage member having a longitudinal center of axis, wherein said top swage member has a first cylindrical surface that extends to a second conical surface;
   a first sealing member disposed about said top swage member, said first sealing member containing a first plurality of circumferential ribs disposed about said first sealing member, and wherein said first sealing member has a top end and a bottom end and wherein said first cylindrical surface is concentrically disposed within said first sealing member;
   a second sealing member attached to said first sealing member, said second sealing member containing a second plurality of circumferential ribs disposed about said second sealing member, and wherein said second sealing member has a top end and a bottom end;
   a bottom swage member disposed within said second sealing member, said bottom swage member having a longitudinal center of axis;
   a setting means for driving said top swage longitudinally downward relative to said top swage's longitudinal center axis and for driving said bottom swage longitudinally upward relative to said bottom swage member's center of axis; and,
   an extension member disposed between said first sealing member and said second sealing member, said extension member having a first end connected to the bottom end of said first sealing member and a second end connected to the top end of said second sealing member.

2. The apparatus of claim 1 wherein said bottom swage member has a first cylindrical surface that extends to a second conical surface, and wherein said first cylindrical surface is concentrically disposed within said second sealing member.

3. The apparatus of claim 2 wherein said ribs of said first sealing member is a series of grooves, said grooves having a radius of curvature of approximately 0.0470 inches, and wherein said grooves have a height of approximately 0.033 inches.

4. The apparatus of claim 3 wherein said ribs of said second sealing member is a series of grooves, said grooves having a radius of curvature of approximately 0.0470 inches, and wherein said grooves have a height of approximately 0.033 inches.

5. The apparatus of claim 4 wherein said first sealing member further comprises an elastomeric seal.

6. The apparatus of claim 4 wherein said second sealing member further comprises an elastomeric seal.

7. The apparatus of claim 4 wherein said first sealing member and said second sealing member is comprised of a metal having a hardness of 105 or less on the Rockwell B scale.

8. The apparatus of claim 4 wherein said top swage member and said bottom swage member is comprised of a metal having a hardness of 108 or higher on the Rockwell B scale.

9. A method of sealing and anchoring a device within a tubular member comprising:
   positioning the device in an internal diameter wall of the tubular member, the device comprising: a top swage member disposed within the tubular member, said top swage member having a longitudinal center of axis; a first sealing member disposed partially about said top swage member, said first sealing member containing a first plurality of continuous circumferential ribs disposed about said first sealing member, and wherein said first sealing member has a top end and a bottom end wherein the first sealing member further comprises a first elastomeric member circumferentially disposed thereon; a second sealing member attached to said first sealing member, said second sealing member containing a second plurality of continuous circumferential ribs disposed about said second sealing member, and wherein said second sealing member has a top end and a bottom end; a bottom swage member disposed partially within said second sealing member, said bottom swage member having a longitudinal center of axis;
   driving said top swage longitudinally downward relative to said top swage's longitudinal center of axis with a setting tool member, said setting tool member being selectively attached to the device;
   driving said bottom swage longitudinally upward relative to said bottom swage's longitudinal center of axis;
   expanding the first sealing member radially outward and wherein the step of expanding radially outward includes forcing the first elastomeric member against the internal diameter wall, and providing a secondary seal for the device within the internal diameter wall;
   expanding the second sealing member radially outward;
   embedding at least one of said first plurality of continuous circumferential ribs into the internal diameter wall;
   embedding at least one of said second plurality of continuous circumferential ribs into the inner diameter wall;
   sealing the device within the internal diameter wall with at least one of said first plurality of continuous circumferential ribs;
   sealing the device within the internal diameter wall with at least one of said second plurality of continuous circumferential ribs;
   anchoring the device within the internal diameter wall with at least one of said first plurality of continuous circumferential ribs;
   anchoring the device within the internal diameter wall with at least on of said second plurality of continuous circumferential ribs.

10. The method of claim 9 wherein the second sealing member further comprises a second elastomeric member circumferentially disposed thereon and wherein the step of expanding the second sealing member radially outward includes:

forcing the elastomeric member against the internal diameter wall;

providing a tertiary seal for the device within the internal diameter wall;

and wherein the step of driving said top and bottom swage upward and downward includes:

pumping a hydraulic fluid;

forcing a power piston in the tool in an upward direction so that said lower swage is moved upward;

forcing an outer sleeve in the tool in a downward direction so that the upper swage is moved downward.

11. The method of claim 10 further comprising:

shearing a shear ring operatively attaching the device to the setting tool means;

retrieving the setting tool means from the tubular member.

12. An apparatus for sealing and anchoring within a tubular member, the apparatus comprising:

a top swage member, said top swage member having a longitudinal center of axis and having a first end and a second end;

a first sleeve being at least partially disposed within the first end of said top swage, said first sleeve being made of a malleable metal having a hardness of 105 or less on the Rockwell B scale and wherein said first sleeve contains a first plurality of circumferential ribs disposed thereon, and wherein said first sleeve has a top end and a bottom end and wherein said first sleeve has disposed thereon a first elastomeric seal;

a second sleeve attached to said first sleeve, said second sleeve being made of a malleable metal having a hardness of 105 or less on the Rockwell B scale, and wherein said second sleeve contains a second plurality of continuous circumferential ribs disposed thereon, and wherein said second sleeve has a top end and a bottom end and wherein said second sleeve has disposed thereon a second elastomeric seal and wherein said ribs of said first sleeve comprise a series of grooves, said grooves having a radius of curvature of between 0.030 inches to 0.060 inches, and wherein said ribs of said second sleeve comprise a series of grooves, said grooves having a radius of curvature of between 0.030 inches to 0.060 inches;

a bottom swage member disposed within said second sleeve member, said bottom swage member having a longitudinal center of axis and having a first end and a second end, and wherein said first end is disposed within said bottom swage member;

a setting means for driving said top swage longitudinally downward relative to said top swage's longitudinal center axis and for driving said bottom swage longitudinally upward relative to said bottom swage's center axis.

* * * * *